(12) United States Patent
Mizuta

(10) Patent No.: US 6,517,111 B2
(45) Date of Patent: Feb. 11, 2003

(54) FOUR-WHEELED UTILITY VEHICLE

(75) Inventor: Fumio Mizuta, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/741,164

(22) Filed: Dec. 21, 2000

(65) Prior Publication Data

US 2001/0004950 A1 Jun. 28, 2001

(30) Foreign Application Priority Data

Dec. 28, 1999 (JP) .......................... 11-372776

(51) Int. Cl.[7] .............................................. B60R 21/13
(52) U.S. Cl. ...................... 280/756; 180/311; 296/102
(58) Field of Search ................. 280/756, 781, 280/DIG. 5; 180/311, 908; 296/102

(56) References Cited

U.S. PATENT DOCUMENTS

| 3,622,177 | A | * | 11/1971 | Notestine et al. | ....... 280/150 C |
| 3,815,701 | A | | 6/1974 | Mayhew | |
| 4,359,131 | A | | 11/1982 | Messner et al. | |
| 4,538,752 | A | * | 9/1985 | Welter | ....... 224/309 |
| 4,785,900 | A | | 11/1988 | Nasky | |
| 4,862,981 | A | | 9/1989 | Fujikawa et al. | |
| 4,900,058 | A | * | 2/1990 | Hobrecht | ....... 280/756 |
| 5,086,858 | A | * | 2/1992 | Mizuta et al. | ....... 180/68.3 |
| 5,136,752 | A | | 8/1992 | Bening et al. | |
| 5,393,194 | A | * | 2/1995 | Smith | ....... 414/546 |
| 5,660,244 | A | | 8/1997 | Matsuda | |
| 5,718,303 | A | | 2/1998 | Ogasawara et al. | |
| 5,738,179 | A | | 4/1998 | Matsui | |
| 6,030,029 | A | | 2/2000 | Tsuda et al. | |
| 6,082,477 | A | | 7/2000 | Murakwa | |
| 6,149,228 | A | * | 11/2000 | O'Neill et al. | ....... 296/190.03 |
| 6,213,235 | B1 | | 4/2001 | Elhardt et al. | |
| 6,276,480 | B1 | | 8/2001 | Aregger | |
| 6,276,745 | B1 | | 8/2001 | Wilson | |

FOREIGN PATENT DOCUMENTS

| JP | 63-202579 | | 12/1988 | |
| JP | U-1-122374 | | 8/1989 | |
| JP | A-1-202582 | | 8/1989 | |
| JP | U-4-57486 | | 5/1992 | |
| JP | 6-32189 | * | 6/1994 | ....... B60R/21/13 |
| JP | A-10-119830 | | 5/1998 | |

OTHER PUBLICATIONS

Renault Dauphine–Specifications; The Autocar, Mar. 9, 1956.

* cited by examiner

Primary Examiner—Kenneth R. Rice
Assistant Examiner—Christopher Buchanan
(74) Attorney, Agent, or Firm—Oliff & Berridge, PLC

(57) ABSTRACT

A four-wheeled utility vehicle has: a body frame; a driver's seat disposed on the body frame; and a cabin frame having a front portion and surrounding the driver's seat. The front portion has a pair of lower end portions with vertical joining surfaces. The lower end portions are joined to right and left side surfaces of the body frame via the vertical joining surfaces with bolts having horizontal axes.

7 Claims, 8 Drawing Sheets

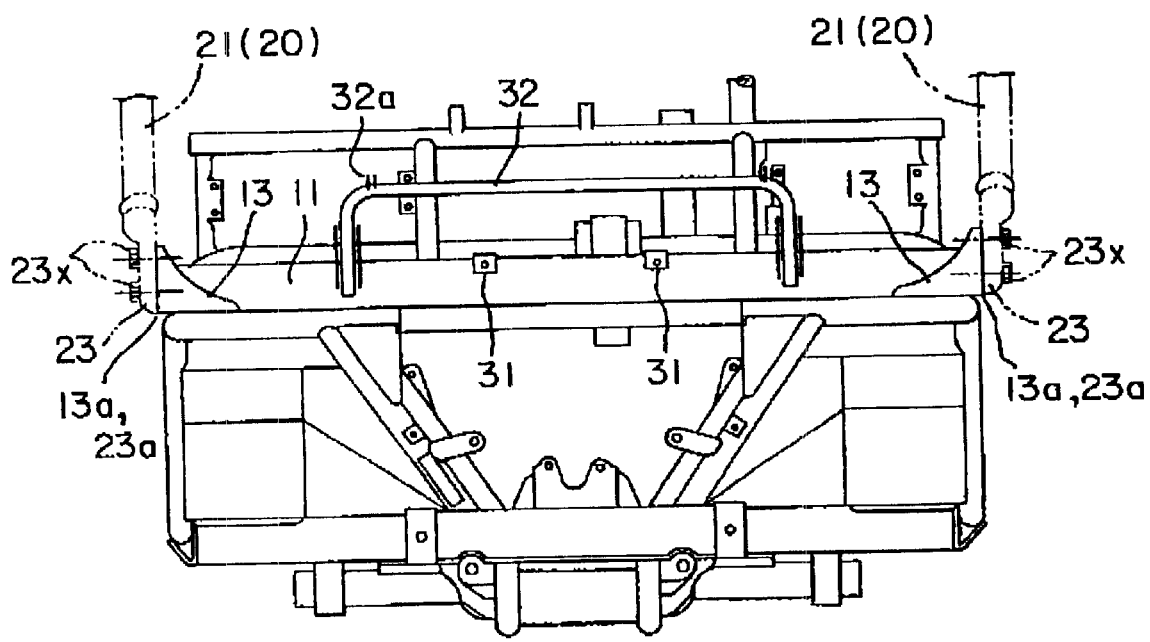
F I G. 5A
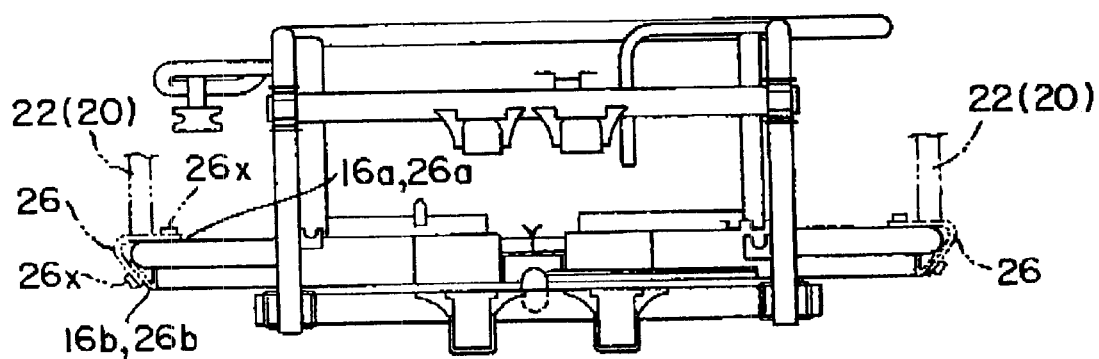
F I G. 5B

FOUR-WHEELED UTILITY VEHICLE

BACKGROUND OF THE INVENTION

1. Field of the Invention

The present invention relates to a four-wheeled utility vehicle suitable for carrying goods in outdoor spaces or in wide indoor spaces and provided with a cabin frame (also called as a cab frame) surrounding an operators seat.

2. Description of the Related Art

Referring to FIGS. 8A and 8B showing a general four-wheeled utility vehicle disclosed in Japanese utility model Publication No. Shou 63-202579, the four-wheeled utility vehicle has a body frame 10 of a metal, four wheels, i.e., two front wheels 2 and two rear wheels 3, suspended from the body frame 10, a driving unit, such as an engine, mounted on the body frame 10, a driver's seat 4 and a load-carrying platform 5. The four-wheeled utility vehicle is often provided with wide tires suitable for traveling on rough roads.

A cabin frame 20' is disposed in front of the load-carrying platform 5 so as to cover the front, rear, right and left sides of the driver's seat 4. The cabin frame 20' protects the driver. A roof or a hood, not shown, can be attached to the cabin frame 20' to screen the driver's seat 4 from rain and sunshine, and lighting devices 7 can be attached to the cabin frame 20' for illumination to facilitate work at night.

As shown in FIGS. 8A and 8B, a front portion of the cabin frame 20' has a rectangular frame having front pillars 21' and a cross bar 21h' extended between the front pillars 21'. Lower end portions of the front pillars 21' of the cabin frame 20' are held on a front part of the body frame 10 by joints 23'. The joints 23' have substantially horizontal joining surfaces that are fastened to front right and front left portions of the body frame 10 with bolts having their axes substantially vertical.

This known four-wheeled utility vehicle has the following problems.

a) The interval between the right and left joints 23' holding the lower end portions of the front pillars 21' 'must be accurately determined so that the right and left joints 23' coincide with joining portions of the boy frame 10, respectively. Holes, not shown, for passing the bolts must be formed in the right and left joints 23' at an interval accurately corresponding to an interval between holes for bolts on the body frame 10. If the interval between the holes formed in the body frame 10 (distance p in FIG. 8A) and the interval between the holes formed in the joints 23' holding the lower end portions of the front pillars 21' of the cabin frame 20' are different, the bolts cans be passed through the holes toned in the joints 23' and the corresponding holes formed in the body frame 10. As a result, the joints 23' cannot be fastened to the body frame 10. When the cross bat 21h' is extended between the lower end portions of the front pillars 21' of the cabin frame 20' as shown in FIG. 8a to increase the rigidity of the cabin frame 20' and the holes of the joints 23' and the holes of the body frame 10 do not coincide with each other, additional holes must be formed again in the joints 23' or the body frame 10. Since the distance between the lower end portions of the front pillars 21' of the cabin frame 20' is subject to be changed during welding or the like, it is very difficult to form the cabin frame 20' accurately in desired dimensions. Forming the cabin frame 20' accurately in desired dimensions increases the manufacturing cost of the utility vehicle. The foregoing problem is true of a case where holes for bolts are formed in the joints 23' (or the body frame 10) and bolts are attached to the body frame 10 (or the joints 23').

b) It is difficult to dispose a hood in front of and adjacent to the driver's compartment under the cabin frame 20' so as to be opened easily. If the hood is disposed so as to cover a front portion of the body frame 10, when the joints 23' of the pillars 21' are placed on and fastened to the body frame 10, the hood cannot be opened unless the cabin frame 20' is removed from the body frame 10. If the hood is formed between the joints 23' of the cabin frame 20' so that it can be opened, the width of the hood is inevitably excessively small. If the cabin frame 20' is provided with the cross bar 21h' extended between the lower portions of the front pillars 21' as shown in FIG. 8A, the cross bar 21h' restrains the hood from wide opening.

SUMMARY OF THE INVENTION

The present invention has been made to solve the foregoing problems a) and b) and it is therefore an object of the present invention to provide a four-wheeled utility vehicle provided with a cabin frame capable of being easily formed and permitting disposing a large hood in front of a driver's compartment under the cabin frame.

According to the present invention, a four-wheeled utility vehicle has: a body frame; a driver's seat disposed on the body frame; and a cabin frame having a front portion and surrounding the driver's seat, the front portion having a pair of lower end portions with vertical joining surfaces, the lower end portions being joined to right and left side surfaces of the body frame via the vertical joining surfaces with bolts having horizontal axes.

Unless otherwise specified, the words "front", "rear", "right" and "left" are used herein to signify position or direction with respect to the direction of forward travel of the fourwheeled utility vehicle. The words "lateral", "back-and-forth", "vertical" and "horizontal" are not used in strict sense and is used to signify being substantially lateral, being substantially back-and-forth, being substantially vertical and being substantially horizontal.

In this four-wheeled utility vehicle, respective portions of the body frame and the cabin frame relating to the connection of the body frame and the cabin frame can be formed in dimensional accuracy lower than that in which the body frame and the cabin frame of the conventional four-wheeled utility vehicle are formed. Since the lower end portions of the front portion of the cabin frame are joined to the right and left side surfaces of the body frame via the vertical joining surfaces of the lower end portions and fastened to the right and left side surfaces of the body frame with the bolts having axes in a horizontal direction, the distance between the vertical joining surfaces of the lower end portions does not need to coincide precisely with the distance been the right and the left side surface of the body frame. When those distances do not coincide with each other, the lower end portions of the front portion of the cabin frame can be warped elastically so that the distance between the vertical joining surfaces coincides with the distance between the right and the left side surfaces of the body frame. If the lower end portions of the front portion of the cabin frame are difficult to warp elastically, the lower end portions of the cabin frame are formed so that the distance between the vertical joining surfaces of the lower end portions is slightly greater than the distance between the right and the left side surfaces of the body frame. In this case, shims may be inserted in gaps between the right and the left side surfaces of the body frame and the corresponding vertical joining surfaces of the lower end portion of the cabin frame when fastening the lower end portions to the body frame with the horizontal bolts. Therefore, the distance between the vertical joining surfaces of the lower end portions of the cabin frame does not need to be highly accurate. The cabin frame that can be formed in a low dimensional accuracy reduces the manufacturing cost of the four-wheeled utility vehicle and facilitates work for attaching the cabin frame to the body frame.

Preferably, the four-wheeled utility vehicle has an openable hood disposed on a front portion of the body frame. Preferably, the front portion of the cabin frame is formed in a shape resembling an inverted letter u and has right and left vertical members and a horizontal member extending between upper ends of the right and the left vertical members, the right and the left vertical members being extended on outer sides of opposite sides of the hood.

The front portion of the cabin frame having the shape resembling the inverted letter U can be laterally and elastically warped so that the distance between the vertical joining surfaces of the lower end portions of the front portion of the cabin frame coincides with the distance between the right and the left side surfaces portions of the body frame.

The four-wheeled utility vehicle can be provided with a large hood of a large area capable of easily be opened under the front portion of the cabin frame on a front portion of the body frame. Since the front portion having the shape of the inverted letter U does not have any member that extends over the hood disposed between the lower end portions of the front portion of the cabin frame, the hood can be wide opened.

The hood ran be formed in a large area because the lower end portions of the front portion of the cabin frame are fastened to the body frame with the vertical joining surfaces thereof in contact with the right and the left side surfaces of the body frame. Even if the vertical joining surfaces are set to be large in order to make the joints strong, a large space for the hood is available between the vertical joining surfaces. If the lower end portions of the cabin frame are fastened to the right and the left side surfaces of a widest portion of the body frame, the hood can be formed in a great width nearly equal to the overall width of the body frame of the four-wheeled utility vehicle. The long distance between the vertical joining surfaces is nothing but a means for forming the hood in a big width and a large area. The hood of a large area capable of being opened wide and disposed in front of the driver's compartment between the vertical airs of the front portion of the cabin frame facilitates actions to reach into a space under the hood, such as a trunk space for putting things in or taking the same out of the space. A front portion of the four-wheeled utility vehicle can be formed in compact construction, which is advantageous to the four-wheeled utility vehicle.

Preferably, the four-wheeled utility vehicle has a crossbar attached to the body frame and having opposite end portions, and brackets attached to the opposite end portions of the crossbar and having the vertical joining surfaces for joining the lower end portions of the front portion of the cabin frame.

In this four-wheeled utility vehicle, the lower end portions of the front portion of the cabin frame can be firmly held on the opposite ends of the crossbar attached to the body frame because, differing from flat plate-shaped members, the opposite end portions of the cross bar restrain the lower end portions of the front portion of the cabin frame rigidly from movement in all directions. The distance between the lower end portions of the front portion of the cabin frame can be determined principally by the distance between the opposite end portions of the crossbar. The crossbar can be easily processed and can be made at a low manufacturing cost. Since the crossbar supporting the front portion of the cabin frame is disposed in a front portion of the body frame, the crossbar can be used also for supporting parts such as the hood and headlight to be disposed in the front portion of the body frame. Thus, the crossbar is used effectively to prevent increase in the body weight of the four-wheeled utility vehicle.

Preferably, the cabin frame has a rear portion including a lower end portion, the lower end portion being provided with a curved joint having a horizontal joining surface and a vertical joining surface, the curved joint being fastened to the body frame via the horizontal and the vertical joining surfaces with a pair of bolts, one of the bolts having an axis perpendicular to the horizontal joining surface, and another of the bolts having an axis perpendicular to the vertical joining surface.

The connection of the rear portion of the cabin frame to the body frame by the cured joints enhances the rigidity of the rear portion of the cabin frame because the curved joints are fastened to the body frame with the horizontal and the vertical joining surfaces in contact with the surfaces of the body frame. Wherry a joint having a single joining surface is liable to be dislocated when a force acts in a direction parallel the joining surface on the joint or a torque acts in a plane including the joining surface of the joint, a joint having a plurality of joining surfaces not parallel to each other is neither moved nor dislocated by such a force and such a torque.

Since the rear portion of the cabin frame can be rigidly supported on the body frame, the cabin frame is sufficiently rigid even if the crossbar is not disposed under the front portion of the cabin frame in order to get a wide space for the hood. Since the lower end portions of the rear portion of the cabin frame are fastened to the body frame, it is easy to make a load-carrying platform mounted in a rear portion of the body frame to be vertically moved relative to the body frame.

BRIEF DESCRIPTION OF THE DRAWINGS

The above and other objects, features and advantages of the present invention will become more apparent from the following description taken in connection with the accompanying drawings, in which:

FIGS. 5A and 5B are front elevation and a rear elevation, respectively, of the body frame shown in FIG. 4;

DESCRIPTION OF THE PREFERRED EMBODIMENTS

Figure 8A:
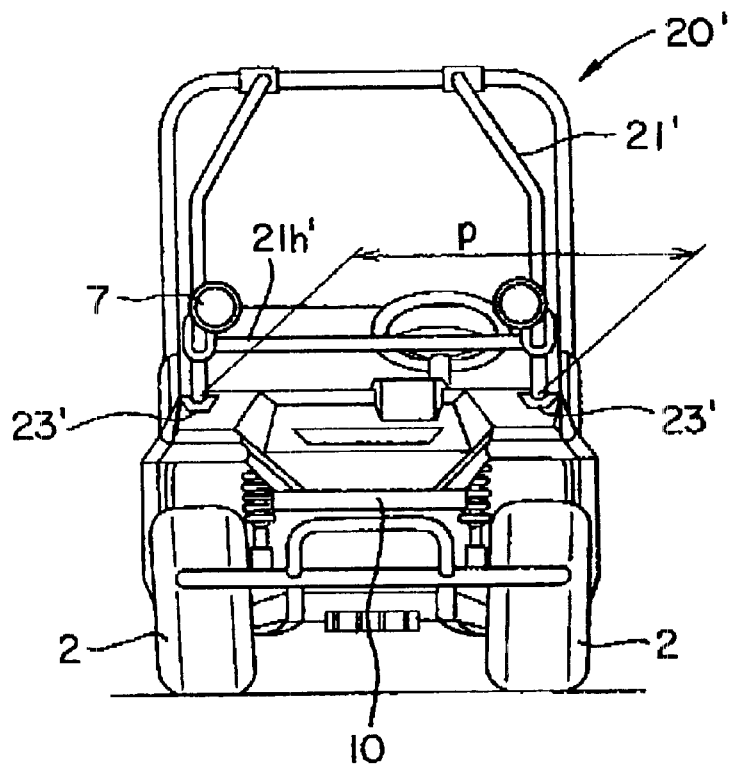
Figure 8B:
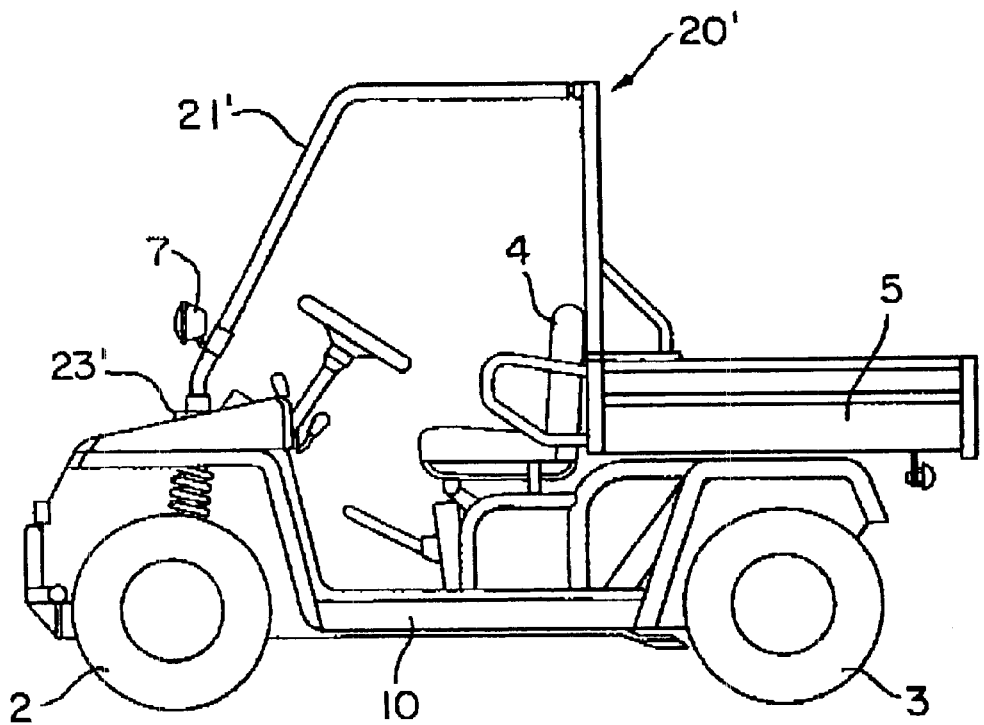

Referring to FIGS. 1A to 3, a fourwheeled utility vehicle in a preferred embodiment according to the present invention has a steel body frame 10, two front wheels 2 and a rear wheels 3, i.e., four wheels in all, a driver's seat 4 and a load-carrying platform 5. The driver's seat 4 and the load-carrying platform 5 are mounted on the body frame 10. A driving system including an engine, not shown, is disposed in a space under the load-carrying platform 5. The driving system drives the rear wheels 3 (or both the front wheels 2 and the rear wheels 3) for traveling. The wheels 2 and 3 are provided with wide tires to enable the four-wheeled utility vehicle to travel on rough roads. The four-wheeled utility vehicle of the present embodiment is substantially similar in basic construction to the conventional four-wheeled utility vehicle as shown in FIGS. 8A and 8B. The four-wheeled utility vehicle embodying the present invention will be described in detail hereinafter.

Referring to FIGS. 1A to 3, the front wheels 2 and the rear wheels 3 are suspended from a front portion and a rear portion, respectively, of the body frame 10. A baggage case 51 (FIGS. 6 and 7) is disposed above the front wheels 2 and an openable hood 30 is supported so as to cover the baggage case 51. A drivers seat 4 is disposed behind the hood 30, and the load-carrying platform 5 is disposed behind the driver's seat 4. The load-carrying platform 5 extends backward from a position near the back of the driver's seat 4 over the rear wheels 3. A cabin frame 20 is disposed between a position in the front portion of the body frame 10 and a position in front of the load-carrying platform 5 so as to cover the driver's seat (driver's compartment) 4.

The construction of the cabin frame 20, a method of connecting the cabin frame 20 to the body frame 10, the baggage case 51 and side cases 52 and 53 (FIGS. 6 and 7) are the features of the present invention. The four-wheeled utility vehicle of the present invention differs from the conventional four-wheeled cargo vehicle shown in FIGS. 8A and 8B in those features. Those. features of the present invention will be described hereinafter.

Figure 1A:
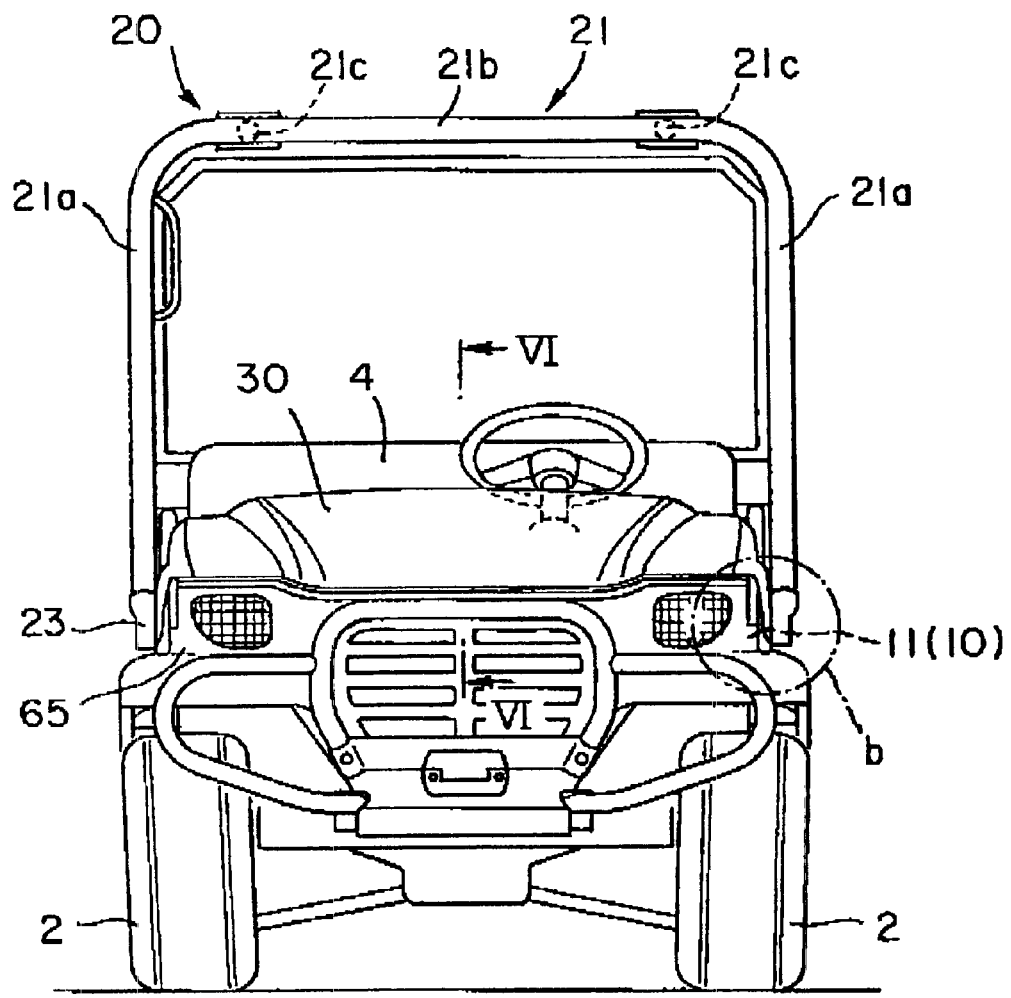
FIG. 1A is a front elevation of a fourwheeled utility vehicle in a preferred embodiment according to the present invention.
Figure 1B:
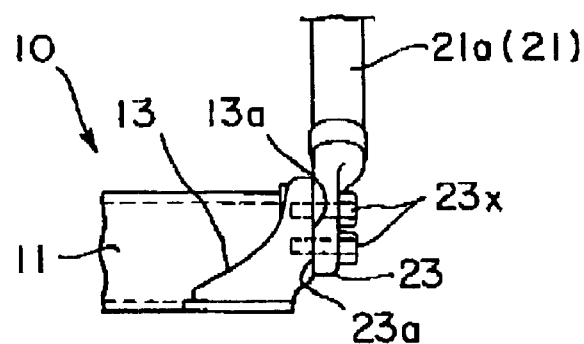
FIG. 1B is an enlarged front elevation of a portion b in FIG. 1A.
Figure 2:
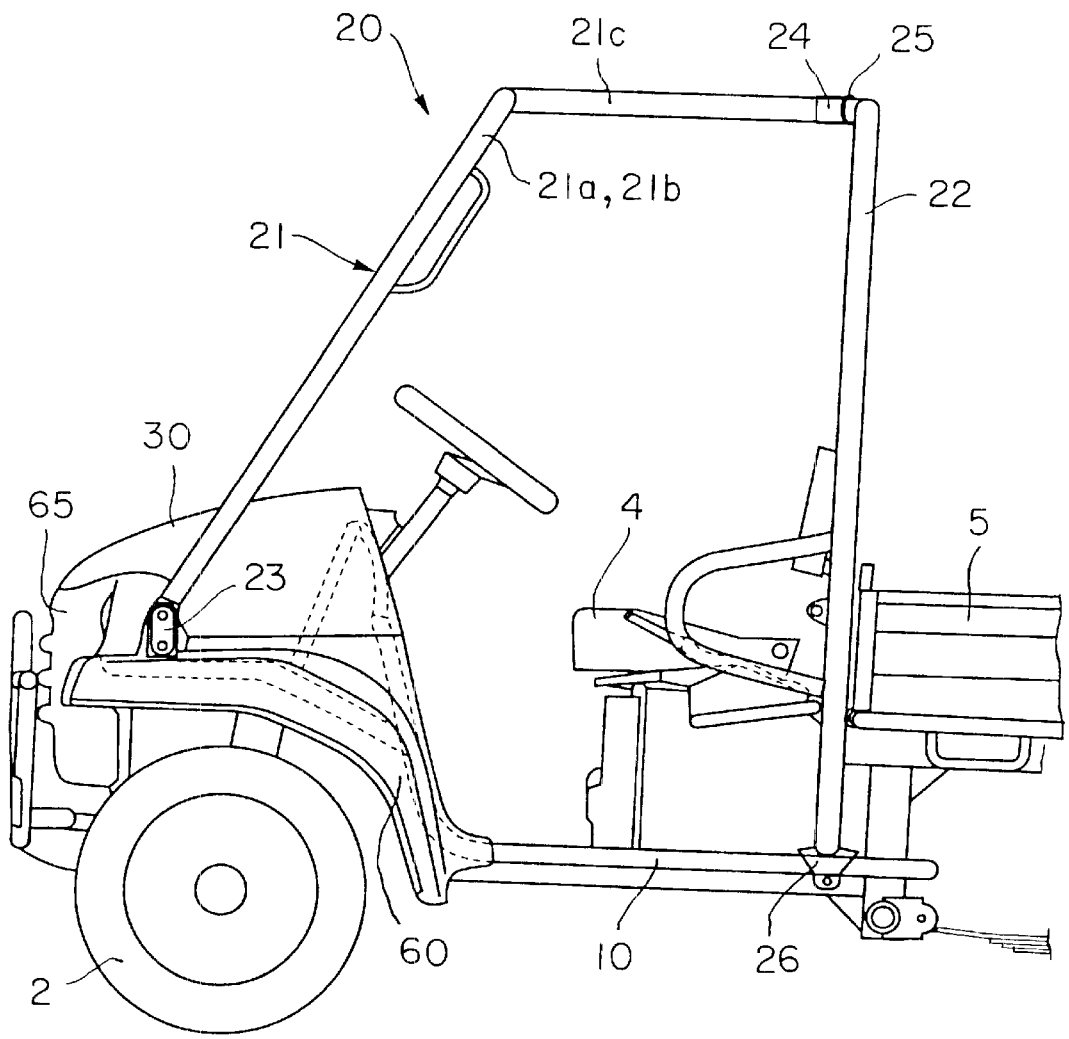
FIG. 2 is a side elevation of a front portion of the four-wheeled utility vehicle shown in FIG. 1A.
Figure 3:
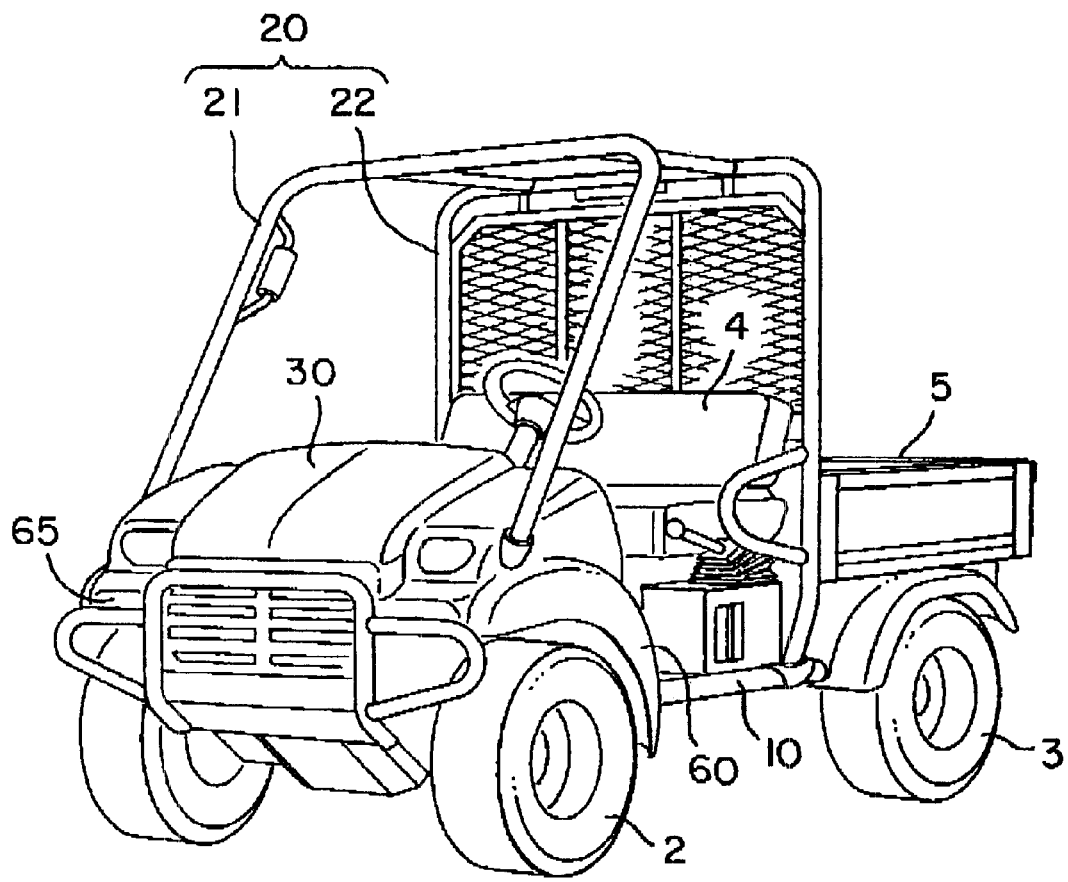
FIG. 3 is a perspective view of the four-wheeled utility vehicle shown in FIG. 1A.

Referring to FIGS. 1A, 1B and 2, the cabin frame 20 has a front portion 21 formed by processing steel pipes and has a shape resembling the inverted letter U. The front portion 21 has vertical members 21a vertically extending on the opposite side of the body of the four-wheeled utility vehicle and a horizontal member 21b formed integrally with the vertical members 21a and horizontally extending between the upper ends of the vertical members 21a. The front portion 21 is not provided with any member corresponding to the crossbar 21h' of the front portion 21' of the cabin frame 20' shown in FIGS. 8A and 8b. The front portion 21 is formed in a shape resembling the inverted letter U to extend the vertical members 21a on the opposite sides of the hood 30, respectively, in order that the large, openable hood 30 can be disposed in front of and adjacent to the driver's seat (driver's compartment) 4 and under the front member 21 of the cabin frame 20. Two connecting members 21c (FIG. 2) connecting the front portion 21 to a rear portion 22 of the cabin frame 20 are welded to the horizontal member 21b.

As shown in FIG. 1B, joints 23 each having a vertical joining surface 23a are attached to lower end portions of the vertical members 21a, and are fastened to brackets 13 attached to a member of the body frame 10 with horizontal bolts 23x with the vertical joining surfaces 23a thereof in contact with vertical joining surfaces 13a of the brackets 13. The joints 23 are made of steel by forging. Since the front portion 21 of the cabin frame 20 is formed in the shape resembling the inverted letter U, and the vertical joining surfaces 23a of the joints 23 are joined to the vertical joining surfaces 13a of the brackets 13, the front portion 21 can be easily joined to the body frame 10 even if the front portion 21 is formed with some error in the distance between the vertical joining surfaces 23a of the joints 23. A process for fabricating the front portion 21 is simple because the distance between the vertical joining surfaces 23a of the joints 23 is a principal object of process control. The hood 30 can be formed in a sufficiently large area even if the joints 23 are large and the vertical joining surfaces 13a of the brackets 13 are large.

Figure 4:
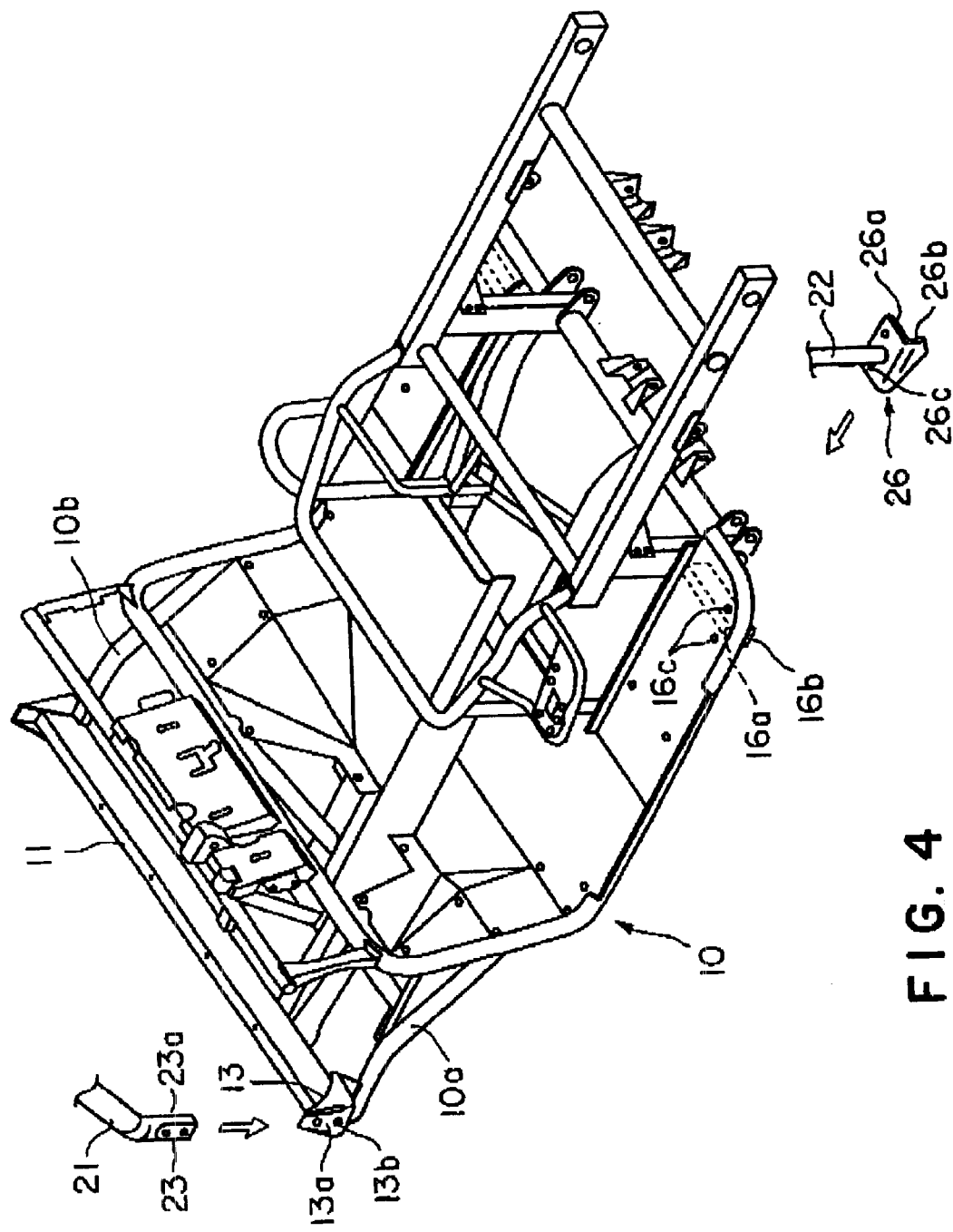
FIG. 4 is a perspective view of a body frame included in the four-wheeled utility vehicle shown in FIG. 1A.

Referring to FIGS. 1B, 4 and 5A, a crossbar 11, such as a rectangular steel pipe, having a length corresponding to the overall width of the body of the four-wheeled utility vehicle is extended between a right main member 10b and a left main member 10a on the body frame 10. The brackets 13 having the vertical joining surfaces 13a for supporting the cabin frame 20 is welded to the opposite end portions of the crossbar 11. Each bracket 13 is provided with two threaded holes 13b (FIG. 4) for the bolts 23x (FIG. 1B) in a vertical arrangement. Since the cross bar 11, i.e., the rectangular steel pipe, has a high mechanical strength and is highly rigid, the front portion 21 of the cabin frame 20 can be firmly and rigidly supported on the body frame 10 by fastening the joints 23 attached to the lower end portions of the vertical members 21a of the front portion 21 to the brackets 13. Since the joints 23 can be fastened to the brackets 13 by passing the bolts 23x horizontally Nigh holes formed in the joints 23 and screwing the bolts 23x in the threaded holes 13b of the brackets 13, the front portion 21 of the cabin frame 20 can be easily attached to the body frame 10 by work on the right and the left side of the body. The distance between the vertical joining surfaces 13a of the brackets 13 is dependent principally on the length of the crossbar 11. The crossbar 11 can be easily formed in a desired length.

The rear portion 22 of the cabin frame 20 shown FIG. 2 is connected to the rear ends of the two connecting members 21c by joints 24 and 25. Lower end portions of the vertical members of the rear portion 22 are connected to the body frame 10 by joints 26. The joints are welded to the lower end portions of the vertical members as shown in FIGS. 4 and 5B and fastened to the body frame 10 with bolts 26x. As shown in FIG. 5B, each joint 26 has two portions, i.e., a horizontal portion having a horizontal joining surface 26a and a vertical portion having a vertical joining surface 26b in contact with two joining surfaces, i.e., a horizontal joining surface 16a and a vertical joining surfaces 16b, of the body frame 10. The vertical joining surfaces 16b and 26b are not literally vertical and are inclined to a vertical plane. The bolts 26x are extended perpendicularly to the joining surfaces 16a, 16b, 26a and 26b. As shown in FIGS. 4 and 5B, two holes 16c for the bolts 26x are formed in a horizontal portion having the joining surface 16a of the body frame 10, two holes 26c for the bolts 26x are formed in the horizontal portion having the joining surface 26a of each joint 26, one hole (not shown) for the bolt 26x is formed in a vertical portion having the joining surface 16b of the body frame 10, and one hole 26c for the bolt 26x is formed in the vertical portion having the joining surface 26b of each joint 26. Since the joints 26 attached to the lower end portions of the vertical members of the rear portion 22 of the cabin frame 20 are fastened to the body frame 10 with the joining surfaces 26a and 26b, which are not parallel to each other, in contact with the joining surfaces 16a and 16b, respectively, the rear portion 22 of the cabin frame 20 can be firmly held on the body frame 10. The rigidity of the cabin frame 20 can be enhanced by connecting middle portions of the vertical members of the rear portion 22 of the cabin frame 20 to the front end of the load-carrying platform 5. If the load-carrying platform 5 is supported on the body frame 10 so that the front end thereof can be raised relative to the rear end thereof, it is preferable to provide the rear portion 22 with a crossbar, and to attach hooking members each having an eye opening downward to front end portions of the load-carrying platform 5 so that the hooking Myers hang over and engage the crossbar when the load-carrying platform 5 is placed at its normal position where the load-carrying platform is held while the four-wheeled utility vehicle is traveling to bind down the middle portions of the vertical members of the rear portion 22 of the cabin frame 20 by the load-carrying platform.

Figure 6:
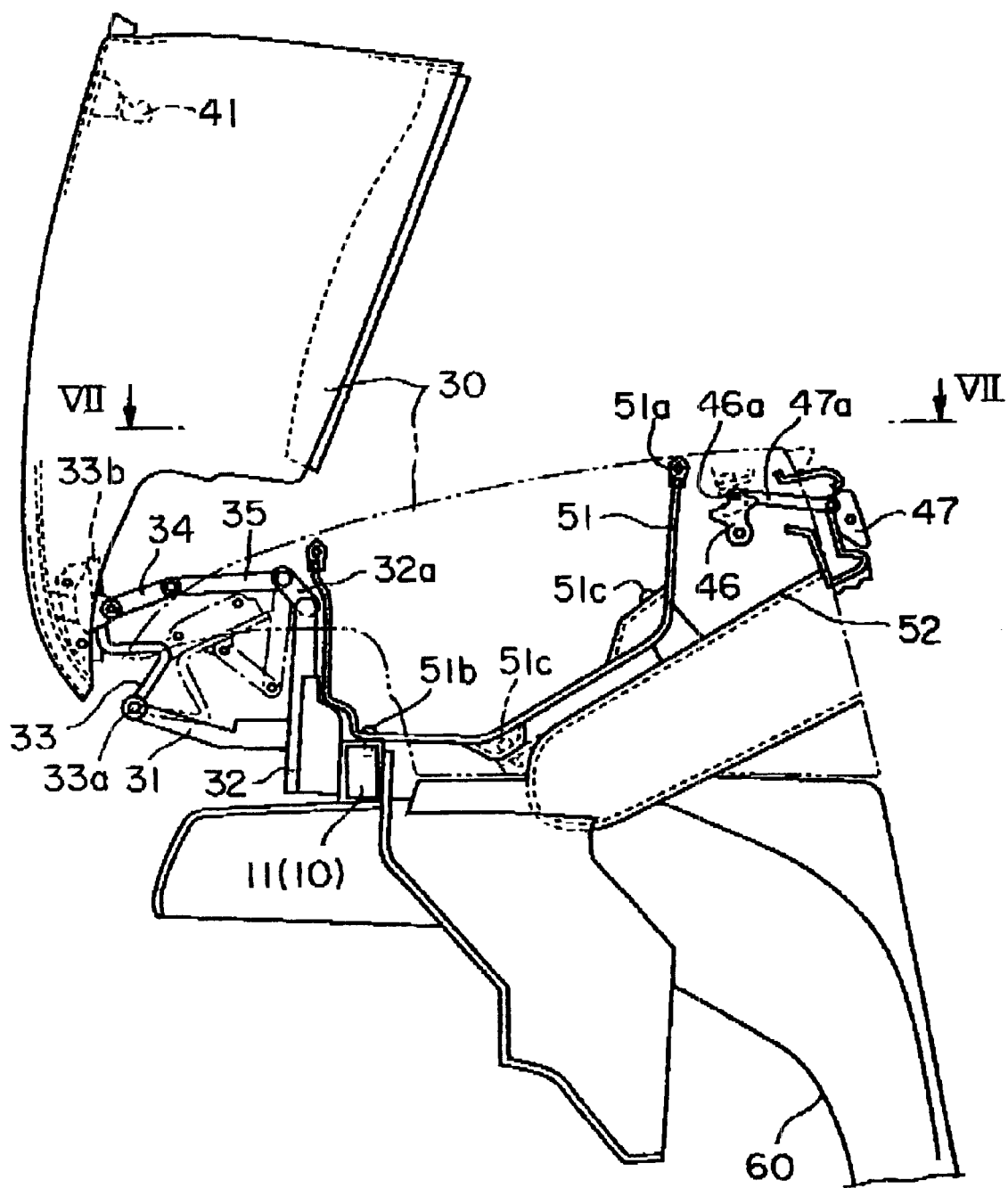
FIG. 6 is a sectional view taken on line VI—VI in FIG. 1A.

Referring to FIGS. 5A and 6, the crossbar 11 extended across the side members of the body frame 10 is used not only specially for supporting the cabin frame 20 but also for supporting support members 31 and 32 for supporting the hood 30. An shown in FIG. 6, a base end portion 33a of a support arm 33 for supporting the hood 30 is joined pivotally to a front end portion of each support member 31. Brackets 32a are attached to an upper member of the support member 32, and a linkage having links 34 and 35 for controlling the swing motion of the hood 30 is connected to each bracket 32a. A locking 41 is attached to an inner surface of the hood 30. Locking mechanism is constituted by members 46, 46a, 47 and 47a for releasably holding the locking member 41.

Figure 7:
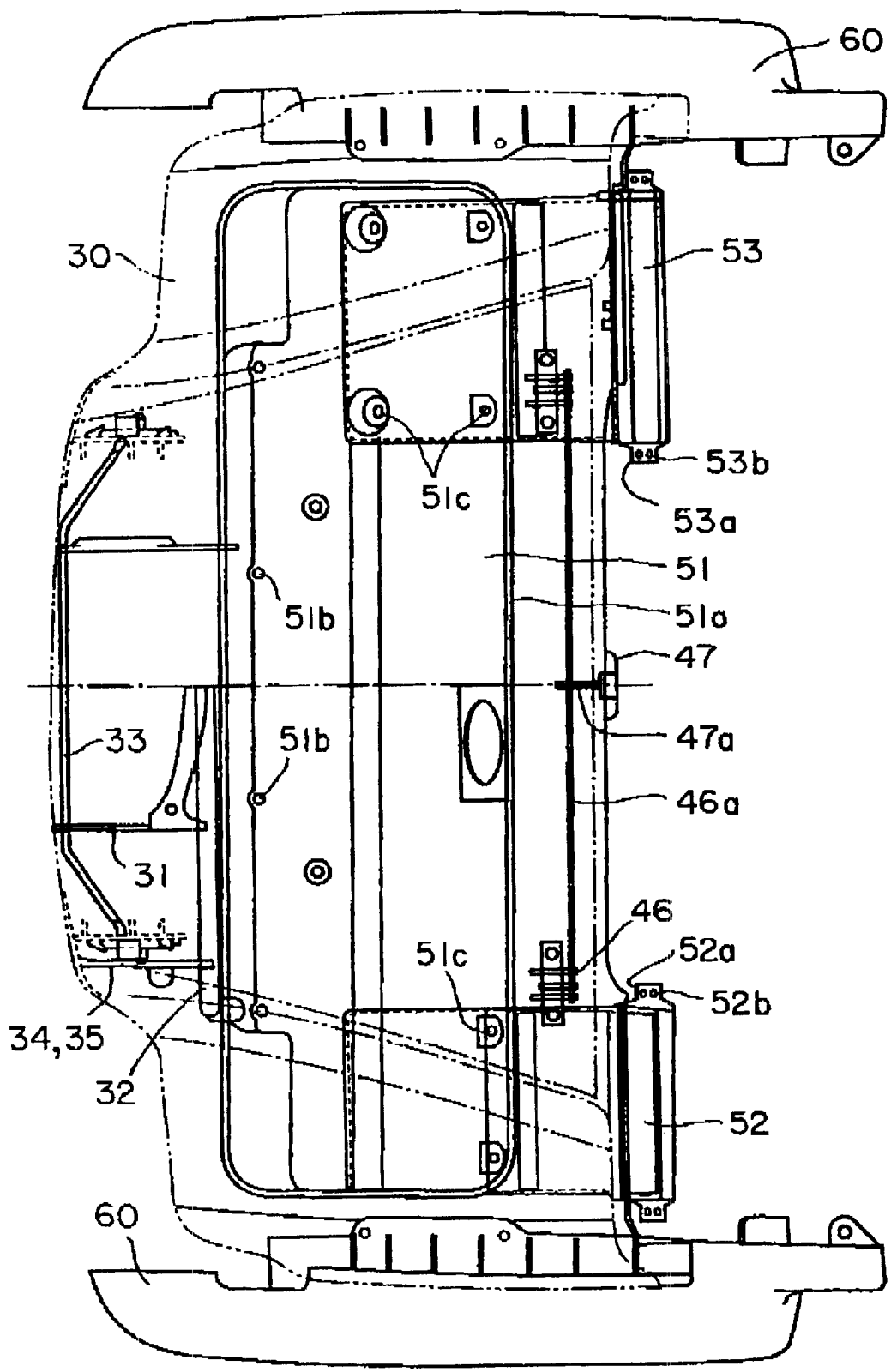
FIG. 7 is a plan view of a front portion of the four-wheeled utility vehicle shown in FIG. 1A as viewed in the direction of the arrows along line VII—VII in FIG. 6, and FIGS. 8A and 8B are a front elevation and a side elevation, respectively, of a conventional four-wheeled cargo vehicle.

As shown in FIGS. 6 and 7, the baggage case 51 and the side cases 52 and 53 are disposed under the openable hood 30. The baggage case 51 has an open upper end and a packing 51a is pot on the rim of the upper end of the baggage case 51. When the hood 30 is closed, the inner surface of the hood 30 is pressed against the packing 51a to seal the baggage case 51. The side cases 52 and 53 are disposed in right and left side portions of the body and have openings opening toward the driver's seat 4 (FIGS. 1A to 3), respectively. Whereas the load-carrying platform 5 is exposed to rain and dust, the baggage case 51 and the side cases 52 and 53 are screened from rain and dust. Therefore the baggage case 51 and the side cases 52 and 53 are suitable for containing clothes documents and such. The baggage case 51 has a bottom wall fastened with bolts 51b to the crossbar 11. The side cases 52 and 53 are provided at their rear ends with flanges 52a and 53a, respectively, and the flanges 52a and 53a are fastened to the body frame 10 with bolts 52b and 53b. The upper walls of the side cases 52 and 53 are fastened to the bottom wall of the baggage case 51 with fasteners 51c. The cases 51, 52 and 53 are formed of a plastic material, such as a polyethylene resin.

As apparent from the foregoing description, the cabin frame 20 can be easily and rigidly attached to the body frame 10, the large openable hood 30 can be disposed in front of and adjacent to the driver's seat 4 under the cabin frame 20, the cases 51 to 53 suitable for containing clothes, documents and such can be disposed under the hood 30, and the crossbar 11 for supporting the cabin frame 20 can be effectively used for supporting the hoods 30 and the cases 51 to 53.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A four-wheeled utility vehicle comprising:
a body frame having a front portion;
a driver's seat disposed on the body frame;
an openable hood disposed on the front portion of the body frame, the openable hood structured such that it is openable from the driver's seat;
a cabin frame having a front portion and a rear portion and surrounding the driver's seat so that a rear end of the openable hood is located within the cabin frame, the front portion of the cabin frame being formed in a shape resembling an inverted letter U and having right and left vertical members and a horizontal member extending between upper ends of the right and left vertical members, the right and left vertical members being extended on outer sides of opposite sides of the openable hood, each of the vertical members of the front portion including a lower end portion with a vertical joining surface, each of the lower end portions being located in a forward position in comparison to a front axle of the vehicle and at a lower level in comparison to an upper surface of the openable hood, the lower end portions being joined to right and left side surfaces of the body frame via the vertical joining surfaces with bolts having horizontal axes, the cabin frame having a front which is uncovered so that the openable hood can move via a space between the vertical members of the front portion of the cabin frame.

2. The four-wheeled utility vehicle according to claim 1, further comprising a crossbar attached to the body frame and having opposite end portions, and brackets attached to the opposite end portions, and brackets attached to the opposite end portions of the crossbar, the brackets having vertical joining surfaces joined respectively with the vertical joining surfaces of the lower end portions of the front portion of the cabin frame.

3. The four-wheeled utility vehicle according to claim 1, wherein the rear portion of the cabin frame has a pair of vertical members, each of the vehicle members including a lower end portion provided with a curved joint having a horizontal joining surface and a vertical joining surface, the curved joint being fastened to the body frame via the horizontal and the vertical joining surfaces with a pair of bolts, one of the bolts having an axis perpendicular to the horizontal joining surface, and another of the bolts having an axis perpendicular to the vertical joining surface.

4. The four-wheeled utility vehicle according to claim 1, wherein the cabin frame has sides which are uncovered.

5. The four-wheeled utility vehicle according to claim 2, wherein the crossbar is used for supporting both the cabin frame and the openable hood.

6. The four-wheeled utility vehicle according to claim 2, wherein the body frame has a right main member and a left main member, the body frame having a width defined by the right and left main members; and
wherein the crossbar has a length corresponding to the width of the body frame and extends between the right and left main members of the body frame, the end portions of the crossbar being attached to the right and left main members, respectively, so that the crossbar strengthens the body frame.

7. The four-wheeled utility vehicle according to claim 1, further comprising a load-carrying platform disposed behind the cabin frame.

* * * * *